United States Patent

Brown

[11] 3,892,281
[45] July 1, 1975

[54] TEMPERATURE MEASURING SYSTEM HAVING SENSOR TIME CONSTANT COMPENSATION

[75] Inventor: Neil L. Brown, Sippiwissett, Mass.

[73] Assignee: The United States of America as represented by the Secretary of the Navy, Washington, D.C.

[22] Filed: July 31, 1974

[21] Appl. No.: 494,000

[52] U.S. Cl. .............................. 73/362 AR; 73/359
[51] Int. Cl. .............................................. G01k 7/16
[58] Field of Search.......... 73/341, 342, 359, 362 R, 73/362 AR

[56] References Cited
UNITED STATES PATENTS

| | | | |
|---|---|---|---|
| 2,573,596 | 10/1951 | Offner | 73/359 |
| 3,111,032 | 11/1963 | Wormser et al. | 73/359 |
| 3,279,256 | 10/1966 | Rainge | 73/342 |
| 3,286,524 | 11/1966 | Malone | 73/341 |
| 3,785,207 | 1/1974 | Brzezinski | 73/362 AR |

*Primary Examiner*—Jerry W. Myracle
*Assistant Examiner*—Frederick Shoon
*Attorney, Agent, or Firm*—R. S. Sciascia; L. I. Shrago

[57] ABSTRACT

The temperature of a fluid medium is measured by a platinum resistance temperature sensor which is in one arm of a first AC excited bridge and by a thermistor which is in one arm of a second similarly excited bridge. The output of the second bridge is processed so as to provide a correction signal whose amplitude varies as the response of a simple high-pass RC filter to a step DC input. This correction signal has the same time constant as the platinum resistor and is combined with the output of the first bridge to yield a composite temperature signal which has the stability of the platinum resistor and the speed of response of the thermistor.

8 Claims, 3 Drawing Figures

A. INPUT

B. PLATINUM THERMOMETER RESPONSE

C. THERMISTOR RESPONSE

D. SERVO-BALANCED BRIDGE RESPONSE

E. COMBINED OUTPUT

TEMPERATURE MEASURING SYSTEM HAVING SENSOR TIME CONSTANT COMPENSATION

The present invention relates generally to apparatus for and methods of measuring temperature and, more particularly, to an arrangement which provides highly precise and accurate seawater temperature measurements at a high data rate.

Surveys made with existing oceanographic instruments have revealed the presence of temperature and salinity variations in the ocean that are much finer than those anticipated. To investigate these microstructures, extremely accurate temperature, pressure and conductivity measurements must be made.

Ocean temperature is usually measured with a platinum resistance thermometer. The response of this type of sensing element, however, is in the order of approximately 300 milliseconds which is inadequate for detecting the fine temperature details now known to occur in the ocean.

Additionally, if the temperature measurement obtained from such a platinum resistance thermometer is utilized with a conductivity measurement obtained from a typical conductivity cell to determine the salinity of the seawater, then the difference in the response times of these two sensors will produce salinity "spikes" whenever a large temperature gradient is encountered. Numerical methods can reduce this error, but they do not approach the improvement obtainable when these sensors have equal response times.

Miniature thermistor beads have also been employed as temperature sensors, and while these devices have response times in the order of 30 milliseconds or less in water moving at 25 cms per second, unfortunately, they do not possess the linearity or long-term stability of the platinum resistance unit.

It is, accordingly, a primary object of the present invention to provide a high speed temperature sensing arrangement which combines some of the important advantages of both the platinum resistance thermometer and the thermistor bead.

Another object of the present invention is to provide a system for measuring ocean temperatures which possesses the accurate and stable response of the platinum resistance thermometer with the fast response of the thermistor bead.

Another object of the present invention is to provide a seawater temperature measuring system which develops output signals having a magnitude range sufficient for conversion into a 16-bit binary number for digital processing.

A still further object of the present invention is to provide a temperature measuring system for recording the fine temperature details of the ocean which is capable of resolving temperature differences in the order of ±0.0005° C.

Briefly, and in somewhat general terms, the above objects of invention are accomplished by deriving a first temperature signal from a platinum resistance element which senses the temperature of the medium and is located in one arm of an AC excited bridge. This first measurement, as mentioned hereinbefore, is comparatively insensitive to relatively fast temperature variations. Consequently, an appropriate corrective signal is formed and added to it to compensate for its poor response. This second signal is derived from a second bridge which is excited in the same manner as the above bridge, however, this bridge has a thermistor in one arm thereof which also senses the temperature of the medium at approximately the same site as the platinum resistor. The output of this second bridge is processed in a manner which produces a signal whose waveform corresponds to the output of a high-pass filter which has a time constant equivalent to that of the platinum resistor when the input to this filter is a DC signal having a step amplitude.

More specifically, the output of this second bridge is continuously balanced by the output of an electronic servo which has an integrator in its control loop. Thus, this bridge is precisely nulled for steady state temperature, but the presence of the integrator causes the nulling voltage to lag the bridge voltage whenever the temperature changes rapidly. This results in an error signal that appears as though its amplitude had been filtered, i.e., differentiated, in a simple high-pass RC filter. The time constant of this error signal is made equal to that of the platinum thermometer by a proper selection of the integrator time constant.

When both temperature signals are combined, the resultant composite signal has the long-term stability and accuracy of the platinum resistor and the speed of response of the thermistor.

Other objects, advantages and novel features of the invention will become apparent from the following detailed description of the invention when considered in conjunction with the accompanying drawings wherein.

Figure 1:
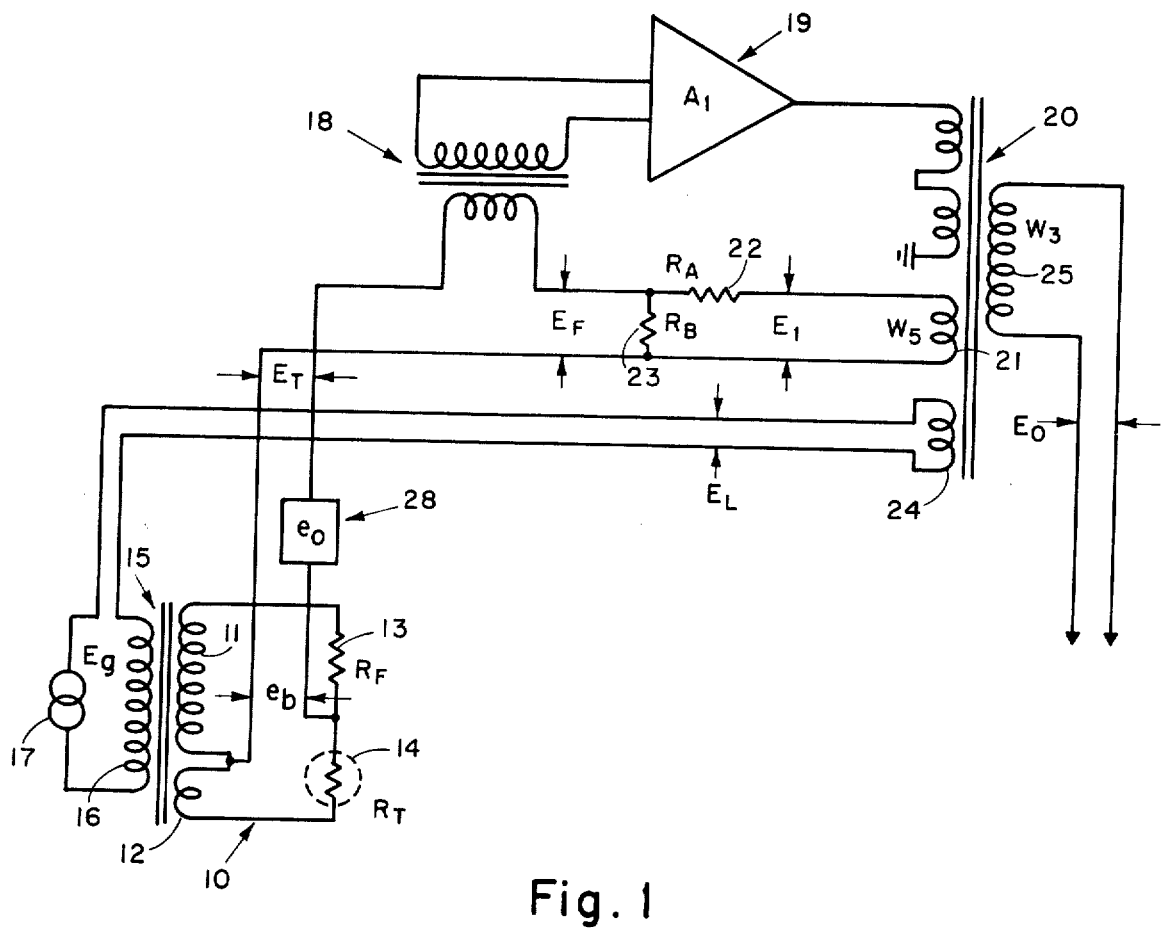
FIG. 1 is a schematic diagram illustrating one preferred embodiment of the present invention.

Referring now to FIG. 1 of the drawings, reference character 10 generally identifies a first temperature bridge which has as its arm elements ratio transformer windings 11 and 12, precision resistor 13 and platinum resistor 14. This last resistor performs as one of the two temperature sensors in the overall system, and, consequently, it is mounted or otherwise positioned so as to contact the medium whose temperature is being measured.

In one embodiment of the invention, this platinum resistance thermometer had a value of 200 ohms at 20° C and 185.3 ohms at 0.3° C. Since self-heating effects determine the maximum permissible current in this thermometer, bridge sensitivity is greatest when precision resistor 13 has an infinite value. However, a resistance value which is 10 times the 0° C resistance of the thermometer, yields a sensitivity within 90° of the theoretical maximum.

Bridge 10 is energized from an AC signal source 17, $E_g$, which feeds the primary winding 16 of transformer 15. In one particular modification, this source was a 10 kHz signal of a preselected constant amplitude. The output of the temperature bridge 10, as mentioned hereinbefore, is comparatively insensitive to relatively fast temperature variations occurring within the medium. To compensate for this deficiency, a complementary signal, $e_o$, obtained from a so-called fast response circuit, represented by box 28 in this Fig., is added to it. This signal, as previously mentioned, has the same 10 kHz frequency as the bridge output and an amplitude which duplicates the response of a simple RC high-pass filter to a step DC input signal.

The thermal response of a small object such as the platinum resistance thermometer 14 employed in the bridge 10 of FIG. 1, in a moving medium such as seawater, can be approximated by the electrical response of an equivalent low-pass filter such as the combination of a series resistor $R_1$ and shunt capacitor $C_1$ to a step change in the amplitude of a DC input signal. This may be seen from FIG. 2. The area A represents the lag error. The output of a high-pass filter consisting of the same series capacitor $C_1$ and a shunt resistor $R_1$ and, thus, having the identical time constant as the above low-pass filter, as shown in this Fig., corresponds to the complement of the error signal missing in the above responses. This holds true for any kind of input and not merely te step function mentioned.

Since the 10 kHz output signal, $e_b$, from bridge 10 in FIG. 1 has the same amplitude response to temperature as the low-pass filter has to a DC step input signal, it may, thus, be corrected to compensate for its poor response by a 10 kHz signal having the same amplitude response to temperature as the above high-pass filter has to a DC step input signal.

Figure 3:
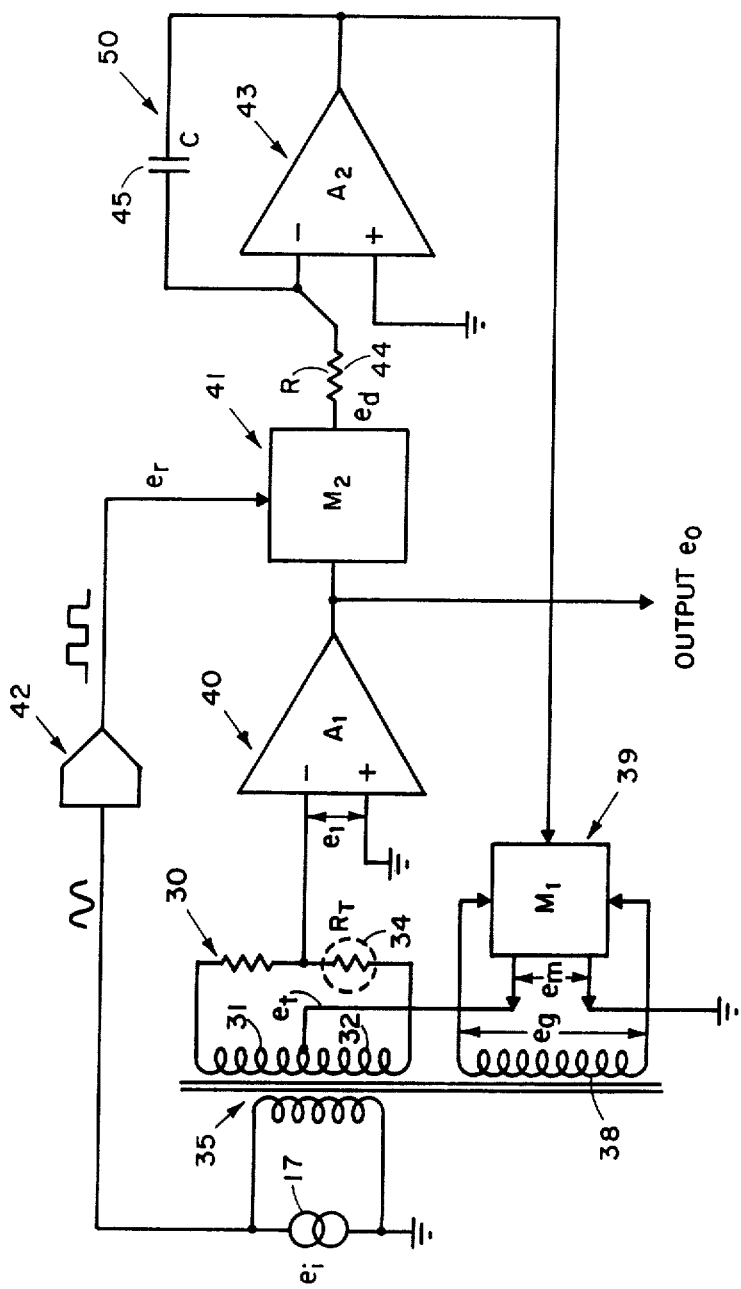
FIG. 3 is a circuit diagram of the fast response circuit which produces the corrective signal required to compensate for the poor response of the platinum temperature sensor of FIG. 1.

The servo balanced thermistor bridge circuit shown in FIG. 3 provides this correction signal, $e_o$. Here, reference character 30 identifies a second temperature bridge which is similar to bridge 10 except that it has a thermistor bead 34 where the latter bridge has the platinum resistor 14. This bead is also mounted to contact the medium whose temperature is being measured and, thus, it performs as a second sensor in the overall system. The other arm elements of this bridge are ratio transformer windings 31 and 32 and precision reference resistor 33. The value of this precision resistor is chosen so that the bridge output voltage, $e_b$, has minimum non-linearity over the range 0 to 30°C. Like its counterpart in FIG. 1, bridge 30 is energized from source 17 by a transformer 35.

Transformer 35 has an additional secondary winding 38 which provides one signal input $e_u$ to a multiplier 39. The other input to this multiplier $E_c$, a DC signal, is obtained from integrator 50.

The output of multiplier 39, $e_m$, is subtracted from the output of bridge 30, $e_t$, and the difference signal $e_I$ is fed to the input terminal of an operational amplifier 40. The output from this amplifier, $e_o$, the correction signal, provides one input to multiplier 41 which has as its other input a reference signal $e_r$ obtained by converting the 10 kHz sine wave signal from source 17 to a square wave of the same frequency and phase by wave shaping circuit 42. Multiplier 41 performs essentially as a phase sensitive detector, and its output, $e_d$, is coupled via resistor 44 to an operational amplifier 43 having a feedback capacitor 45 and performing as an integrator.

Figure 2:
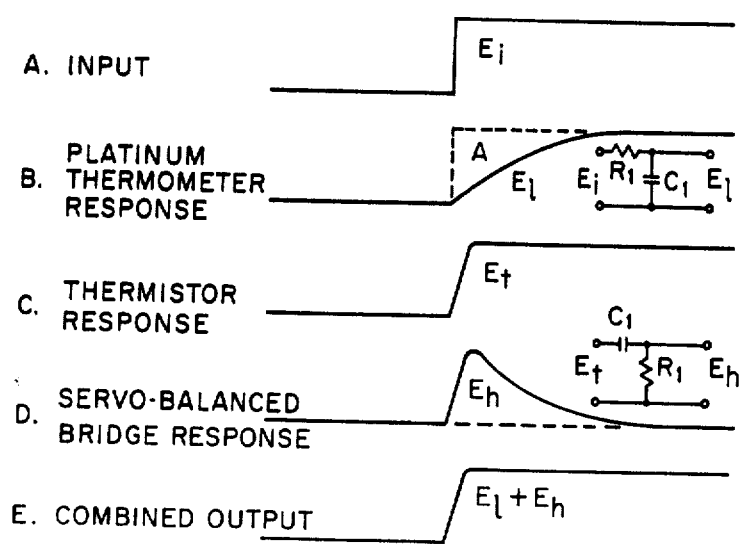
FIG. 2 are waveforms helpful in understanding the operating principle of the invention.

The following analysis is presented to show that the signal processing accomplished in the circuit of FIG. 2 produces an output voltage $e_o$ whose amplitude corresponds to the response of an RC high-pass filter to a DC input signal exhibiting a step change:

Output voltage
$$e_o = e_1 A_1$$
$$= E_1 A_1 \sin \omega t \quad (1)$$

where $\omega = 2\pi \text{frequency}$
$$e_1 = e_t - e_m$$
$$= E_1 \sin \omega t$$
$$e_t = E_t \sin \omega t$$
$$e_m = E_m \sin \omega t$$
$$e_u = E_u \sin \omega t$$

Now $E_m = K_1 E_c E_u$ where $K_1$ = multiplier constant of $M_1$ therefore $e_o = A_1 (E_t - K_1 E_c E_u) \sin \omega t$ i.e. $E_o = A_1 (E_t - K_1 E_c E_u) \quad (2)$ The output of the integrator $E_c$ is given by $$E_c = \frac{1}{RC} \int e_d dt \quad (3)$$

now $e_d = K_2 e_o e_r$

Since $e_r$ is a constant amplitude square wave in phase with $e_i$, we can represent $e_r$ by a Fourier series as follows:

$$e_r = \frac{4}{\pi} E_r (\sin \omega t + \frac{1}{3} \sin 3\omega t + ... + \frac{1}{n} \sin n\omega t + ...) \quad (4)$$

where $n$ = odd integers
and $E_r$ = peak amplitude of square wave therefore $e_d = \frac{4 E_r K_2 E_o}{\pi} \sin \omega t (\sin \omega t + \frac{1}{3} \sin \omega t + ... + \frac{1}{n} \sin n\omega t + ...) \quad (5)$ $= K_3 E_o (\sin^2 \omega t + \frac{1}{3} \sin \omega t \sin 3\omega t + ... + \frac{1}{n} \sin \omega t \sin n\omega t + ...) \quad (6)$ where $K_3 = \frac{4 K_2 E_r}{\pi}$ = constant In the circuit under discussion $\omega$ is very large compared with $1/RC$. Therefore, only zero frequency components of $e_d$ will cause a significant output $E_c$ from the integrator.

Since $\sin^2 \omega t = \frac{1}{2}(1 - \cos 2\omega t)$ the only zero frequency component of $e_d$ is given by $$E_d = \frac{K_3 E_o}{2}$$

therefore $E_c = \frac{K_3}{2RC} \int E_o dt$

Substituting in (2) $E_o = A_1 (E_t - \frac{K_1 E_u K_3}{2RC} \int E_o dt)$ $= A_1 E_t - \frac{K}{RC} \int E_o dt$ where $K = A_1 K_1 K_3 E_u$ The simple high-pass filter mentioned above which consists of a series capacitor $C_1$ and a shunt resistor $R_1$ has the following response:

$$E_h = E_i - \frac{1}{R_1 C_1} \int E_o dt$$

if we make $\quad E_i = A_1 E_t$ and $\quad R_1 C_1 = \frac{RC}{K}$

Then $\quad E_h = E_o$

Thus, the amplitude $E_o$ of the 10 kHz sine wave output $e_o$ has the same response to a change in $e_t$ as the output $E_h$ of the high-pass filter previously described.

The time constant of the fast response circuit is given by the expression $$t = \frac{T}{A_o}$$

where $T = RC$, with R being resistor 44 and C being capacitor 45 and $A_o$ = open circuit gain measured from the output of the integrator to the output of the multiplier 41.

therefore $\quad t = \frac{RC}{A_o}$

Clearly, any value of $t$ can be obtained by selecting appropriate values of $R$, $C$ and $A_o$ to match the thermal response time of the platinum thermometer.

If the thermistor 34 had an instantaneous response to temperature then the output signal $e_o$ could then provide exactly the correct signal to compensate for the effect of the time constant of the platinum resistance thermometer. However, the thermistor response is not instantaneous and, consequently, the system combines the output of the platinum resistance circuit of FIG. 1 and the fast response circuit of FIG. 3 to achieve the advantages hereinbefore mentioned.

It would be pointed out that for a steady state temperature input when $E_t = e_m$, the fast response circuit of FIG. 3 will have a zero output providing the following criteria are satisfied: (1) the zero frequency component ($E_d$) of $e_d$ must always be zero when $e_o$ is zero. Therefore, multiplier 41 must have a zero offset; and (2) the integrator 50 must closely approximate the performance characteristics of an ideal integrator. In other words, when $E_d$ is zero, $E_c$ must not change.

The transformer bridge utilized in FIGS. 1 and 3 has several advantages over the conventional four-resistor bridge. First, this arrangement makes it comparatively easy for efficiently matching the bridge to the AC signal source. Second, it results in a low output impedance which leads to a better signal-to-noise ratio. Additionally, it requires only one reference resistor instead of the usual three, and, finally, the transformer ratio arms have much better long-term ratio stability than equivalent resistors.

The composite temperature signal $E_t$ and the negative feedback signal $E_f$ are coupled via transformer 18 to a high gain amplifying circuit 19. The high gain performance necessary for this circuit is possible since the temperature sensor is energized with a single frequency, namely, 10 kHz.

The amplified signal is fed to an output transformer 20 which has a secondary winding 25 across which the final temperature signal $E_o$ appears. Transformer 20 also has a first feedback winding 24 which introduces a positive feedback voltage $E_L$ in series with source 17 so as to increase the driving voltage energizing temperature bridge 10. This feature compensates for the nonlinear response of the bridge when the temperature of the medium is at a value near the upper limit of the range normally encountered in the medium. If the voltage $E_L$ is not added to the generator voltage $E_G$, then the output voltage $E_T$ will not vary linearly with temperature for two reasons: (1) the resistance-temperature characteristic of platinum resistance thermometers is not perfectly linear and (2) the finite value of precision resistor 10 causes the current through these two components to decrease with increasing values of resistor 10, reducing the incremental output with increasing temperature. However, the addition of $E_L$ increases the excitation voltage to the bridge as the temperature increases, offsetting the decrease in incremental insensitivity. At 0°C, $E_L$ is zero and at 30°C, it equals 1.67 percent of $E_G$.

Transformer 20 also has a second feedback winding 21 which is connected across series resistors 22 and 23 so as to develop across the latter resistor a negative feedback voltage $E_F$ of a magnitude sufficient to achieve the required gain stability in this portion of the system. The amount of feedback necessary for this purpose is impossible to achieve at 10 kHz with conventional operational amplifiers in circuit 19. Consequently, circuit 19 employs two tuned amplifying stages, with at least one of these stages containing parallel LC circuit tuned to resonate at the 10 kHz frequency with a resistance in series therewith. With such an arrangement and with a proper choice of parameters, the amplifying circuit 19 will always have a phase shift less than 180° at those frequencies at which the feedback factor is greater than unity. This insures that the whole amplifying circuit including the input transformer 18 and the output transformer 20 will be stable under closed loop conditions.

In the operation of the circuit of FIG. 1, the composite signal $E_T$ is proportional to the product of temperature T and the supply source voltage $E_g$. The connection to the amplifying circuit 19 and the output transformer 20 are such that the phase of the feedback voltage $E_f$ results in negative feedback. If we assume that the amplifier circuit has infinite gain, we can reason as follows:

$$\begin{aligned} E_F &= E_T \\ &= T \cdot K_1 \cdot E_g \quad (K_1 = \text{Platinum Resistor Calibration constant}) \end{aligned}$$

Also $\quad E_F = E_1 \cdot \dfrac{R_B}{R_A + R_B}$ $\quad = E_o \cdot \dfrac{W_3}{W_5} \cdot \dfrac{R_B}{R_A + R_B}$ i.e. $\quad \dfrac{E_o}{E_g} = T \cdot K_1 \left( \dfrac{W_5}{W_3} \cdot \dfrac{R_A + R_B}{R_B} \right)$ The transformer 20 is designed to have a very stable voltage ratio and resistance $R_A$ and $R_B$ are chosen to have extremely high stability. Consequently, we can say as follows:

where
$$\frac{E_o}{E_R} = T \cdot K$$
$$K = K_1 \left( \frac{W_3}{W_5} \cdot \frac{R_A + R_B}{R_B} \right)$$

The important thing to note is that the ratio of the output voltage $E_o$ to the input voltage $E_u$ is proportional to temperature. The absolute magnitude of either voltage is not significant.

What is claimed is:

1. A method for improving the response of a platinum resistance temperature sensor which is being employed to produce a signal indicative of the temperature of a medium, comprising the steps of measuring the temperature of the medium with a thermistor which also produces a signal indicative of the temperature of the medium;

modifying the amplitude of the signal produced by said thermistor so as to have it correspond to the response of a simple high-pass RC filter to a DC step input signal; and adding the modified amplitude signal from the thermistor to the signal produced by said platinum resistance temperature sensor thereby to obtain a composite signal which has the speed of response of said thermistor and the stability of said platinum resistance temperature sensor.

2. In a system for measuring the temperature of a fluid, the combination of a first bridge having as one of its arm components a platinum resistor, said platinum resistor being adapted to sense the temperature of said fluid;

means for energizing said bridge with an AC reference signal of a known amplitude; and means for producing a correction signal having the same frequency as said reference signal and an amplitude which corresponds to the response of a simple high-pass RC filter to a step DC input signal; and means for combining said correction signal and the output signal of said first bridge thereby to provide a composite signal which has the stability of said platinum and an improved speed of response.

3. In an arrangement as defined in claim 2 wherein said means for producing said correction signal includes a second bridge having as one of its arm components a thermistor, said thermistor being adapted to sense the temperature of said fluid; and means for energizing said second bridge with said AC reference signal.

4. In an arrangement as defined in claim 3 wherein the other components of each bridge are a reference resistor and two windings of a ratio transformer whose primary winding is connected across the source of said reference signal.

5. In an arrangement as defined in claim 3 wherein the time constant of said RC filter equals the response time of said platinum resistor.

6. A system for measuring the temperature of fluid comprising, in combination a first bridge having as one arm component a platinum temperature sensing resistor which is exposed to said fluid;

a second bridge having as one arm component a thermistor which is also exposed to said fluid;

means for energizing both bridges with an AC reference signal of known amplitude;

a multiplier having as one input said AC reference signal;

an amplifier;

a phase sensitive detector having as its inputs the output of said amplifier and a square wave of the same frequency as said reference signal and in phase therewith;

an integrator;

means for coupling the output of said phase sensitive detector to the input of said integrator and the output of said integrator to the other input of said multiplier;

means for subtracting the output of said multiplier from the output of said second bridge and for applying the difference signal resulting therefrom to said amplifier; and means for combining the output of said amplifier and the output of said first bridge thereby to provide a composite temperature signal which has the stability of said platinum resistor and the speed of response of said thermistor.

7. In an arrangement as defined in claim 6 wherein said first and second bridges have as the other arm components a reference resistor and a pair of windings.

8. In an arrangement as defined in claim 6 wherein the output of said multiplier equals the output of said second bridge during a steady state temperature condition.

* * * * *